United States Patent [19]

Matsueda

[11] Patent Number: 4,672,683

[45] Date of Patent: Jun. 9, 1987

[54] IMAGE RETRIEVAL AND REGISTRATION SYSTEM

[75] Inventor: Akira Matsueda, Hachioji, Japan

[73] Assignee: Olympus Optical Co., Ltd., Japan

[21] Appl. No.: 713,498

[22] Filed: Mar. 19, 1985

[30] Foreign Application Priority Data

Mar. 20, 1984 [JP] Japan .................................. 59-53969

[51] Int. Cl.⁴ .......................... G06K 9/00; G09G 3/02
[52] U.S. Cl. .................................... 382/57; 340/707;
340/734; 340/799; 364/521; 382/48
[58] Field of Search .................... 382/57, 48; 340/734,
340/799, 707; 364/521

[56] References Cited

U.S. PATENT DOCUMENTS

| 4,201,978 | 5/1980 | Nally | 382/57 |
| 4,538,182 | 8/1985 | Saito et al. | 382/57 |
| 4,553,261 | 11/1985 | Froessl | 382/57 |
| 4,564,752 | 1/1986 | Lepic et al. | 382/57 |
| 4,566,039 | 1/1986 | Oya | 382/57 |
| 4,566,127 | 1/1986 | Sekiya et al. | 382/57 |

Primary Examiner—Leo H. Boudreau
Attorney, Agent, or Firm—Parkhurst & Oliff

[57] ABSTRACT

A visual information retrieval and registration system including a memory device for storing schematic images and data images, and a display device for displaying simultaneously one of the schematic images and one of the data images readout of the memory device. When a position on the displayed schematic image is indicated by a light-pen, a data image of the indicated position is retrieved and displayed.

12 Claims, 7 Drawing Figures

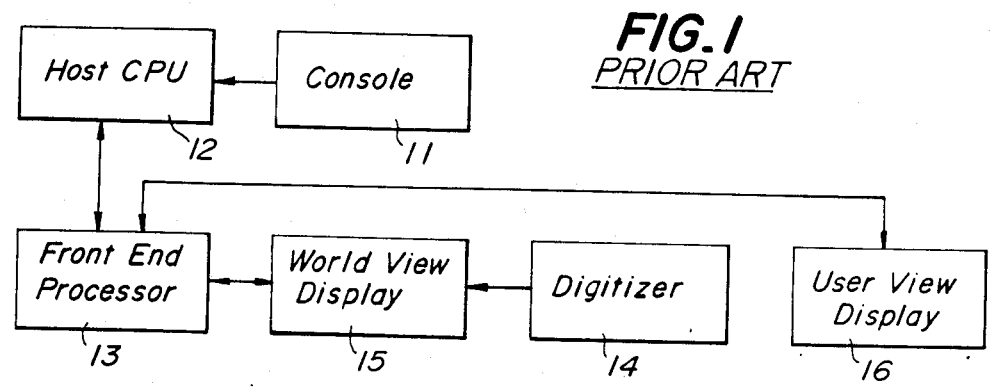
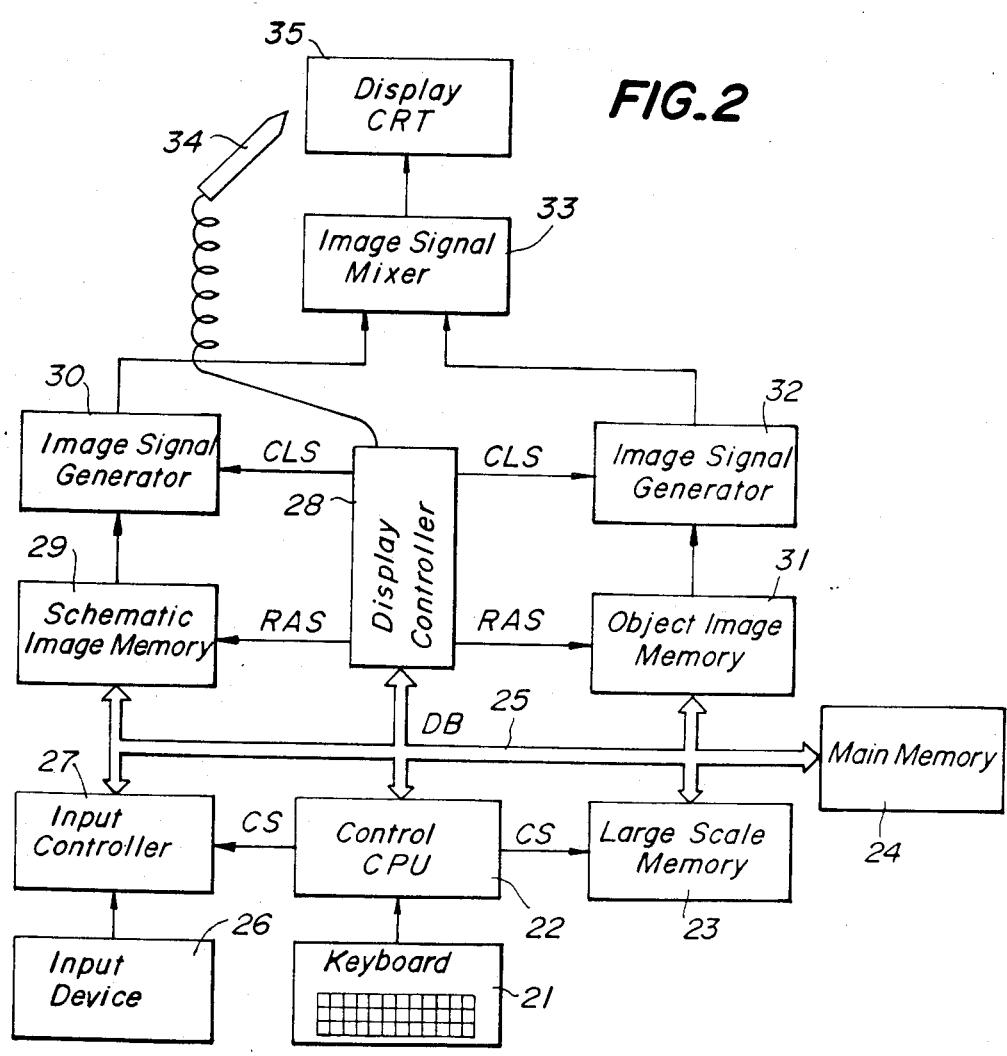

IMAGE RETRIEVAL AND REGISTRATION SYSTEM

BACKGROUND OF THE INVENTION

The present invention generally relates to a visual information retrieval and registration system using a display device, and more particularly to a system for effecting retrieval and registration of visual information with respect to an image file by indicating image data registration and retrieval on an image reproduced on a display device.

Today, very remakable and extensive progress has been made in image processing techniques in various fields such as office automation, satellite communication and medical image filing systems. Particularly, in the medical field, a technique for processing wide particularities and large variety of images has not yet been established. In the medical field various investigations have been conducted in visual information processing which can be applied to various apparatus for obtaining medical images such as endoscopic photography, X-ray photography, X-ray computed tomography (X-ray CT), RI imaging, ultrasonic computed tomography (ultrasonic CT), digital radiography, and nuclear magnetic resonance computed tomography (NMR-CT). In the case of processing medical images, storage, retrieval, transfer and processing of image data can not presently be performed by uniformly classifying them into items such as parts of body and kinds of diseases due to the very wide variety of medical images. That is to say, there are two kinds of attributes for the medical image, i.e. attributes such as patient ID, test dates, and type of imaging apparatus which belong to the image itself and thus can be utilized as keywords and attributes such as diseases and parts of body which belong to a particular patient itself and thus require understanding and judgement of the images.

There has been proposed a medical image processing system which may be used as a medical visual data retrieval system. M. Komori et al have proposed such a system in a report issued on the fourteenth Image Engineering Conference held on December, 1983, pp. 59 to 62. FIG. 1 is a schematic view showing a construction of such a visual image processing system. The system is composed of a host system serving as an image database unit and a retrieval subsystem. Reference numeral 11 denotes a console for entering various attributes of medical images and retrieval commands. The system further comprises a host CPU processing the image database unit, and a front end processor 13 for controlling a world view display 15 and a user view display 16. The world view display 15 is connected to a digitizer 14 which serves as a pointing device. In this known retrieval system, a data space which contains an object to be retrieved is divided into three hierarchies, a first hierarchy for all the data stored in the image database, a second hierarchy consisting of a data space for all data of a patient indexed by a patient ID, and a third hierarchy for a next generation. The image displayed by the world view display 15 is called the world view, because the data in the second hierarchy can be selected by all users. The image displayed on the user view display 16 is named the user view because a selected image is displayed on a screen of the user view display as a retrieval result. The retrieval system thus constructed presents to a user a data space "which can be seen by the eyes of user", from which an image space (user view) is visually constructed. The retrieval is carried out in accordance with the following four steps; formation of the world view, processing in the world view, formation of the user view and display of an original image. The formation of the world view includes sending from the console 11 to the host CPU 12 a patient ID and requires a transmission of abstract images. The transmitted images are classified into groups of imaging apparatus for the sake of convenience and are displayed. The operation in the world view is to select a required image from the displayed world view images with the aid of the digitizer 14 and requires a transmission of the relevant image into the user view display 16. The formation of the user view includes the display of the retrieval result on the user view display 16 by means of the operation of the world view display 15. Then, the user can require a display of a particular original image by monitoring the abstract image i.e. retrieval result displayed on the user view display 16. Then, the world view on the display 15 is erased, and an original image, i.e. a detailed image is displayed on the world view display 15. The user view is still displayed on the display 16, and thus the abstract of retrieval result (user view) and the detail image (original image) are simultaneously displayed. The world view display 15 and user view display 16 may be constructed by image display devices NEXUS 6400 (trade name) and NEXUS 5400 (trade name), respectively.

In the known retrieval system explained above, since the world view display 15 comprises only one frame of memory, and therefore the position of display on the screen can not be changed. That is to say, when the position of display is to be altered, it is necessary to transmit again one frame of the world view from the host CPU 12 and thus the change in the display position can be performed only with difficulty and inconvenience. Further, in the known retrieval system, private attributes such as parts of body and diseases are different for each patient, and thus it is difficult to perform the retrieval in accordance with private attributes. For instance, if a group gastric examination has been conducted by taking endoscopic images of, for example two hundred patients by means of an endoscopic photographying apparatus, the obtained endoscopic images may be recorded on a video tape or magnetic disc separately for each patient and various data processings can be conducted on the basis of the recorded images. It has been earnestly desired by clinical and pathological doctors to develop and establish a novel data processing system for effecting various queries, i.e. how many patients suffer from gastric ulcer, what is the most characteristic part of the gastric ulcer, how many patients suffer from a disease at a predetermined part of body and what diseases are found for each parts of body of a patient. However, such a system has not been established yet.

SUMMARY OF THE INVENTION

The present invention has for its object to provide a novel and useful image retrieval and registration system in which image data can be easily and positively retrieved and registered by indicating image information on a schematic image reproduced on a display screen.

According to the invention an image retrieval and registration system comprises
means for storing one or more schematic images and one or more input image data or retrieved image data;

means for forming a schematic image signal of at least one schematic image readout of the storing means and a data image signal of at least one image data readout of the storing means; and means for receiving said schematic image signal and data image signal and displaying at least one schematic image and at least one data image simultaneously.

BRIEF DESCRIPTION OF THE DRAWINGS

FIG. 1 is a block diagram illustrating a construction of the known medical image data retrieval system;

FIG. 2 is a block diagram showing a construction of an embodiment of the image retrieval and registration system according to the invention;

DESCRIPTION OF THE PREFERRED EMBODIMENTS

Figure 3:
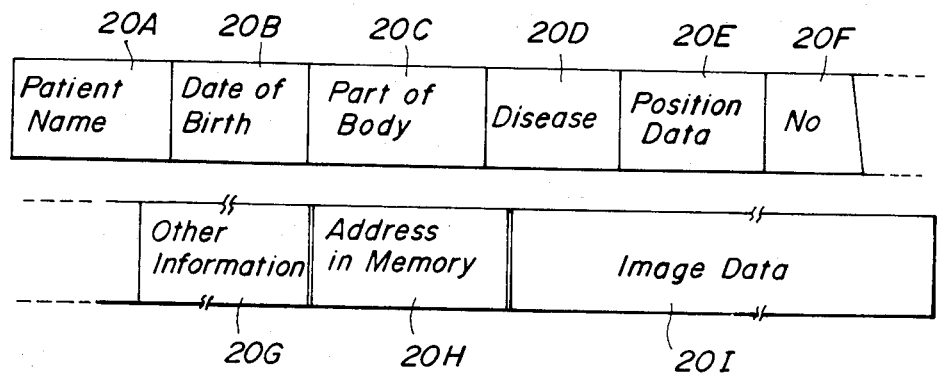
FIG. 3 is a schematic view depicting an embodiment of a data format consisting of information list and image data.

FIG. 2 is a block diagram showing a construction of an embodiment of the image retrieval and registration system according to the invention. The present embodiment is applied to the medical image data processing field. As medical imaging and sensing apparatus there have been developed the endoscope, fundus camera, X-ray photography, X-ray computed tomography, RI imaging, ultrasonic computed tomography, digital radiography, NMR-CT, etc. Hereinafter, these imaging apparatus are called medical apparatus for the sake of simplicity.

In FIG. 2, a reference numeral 21 denotes a keyboard by means of which an operator of a medical apparatus enters various kinds of patient information such as patient ID, instant patient name, date of birth and sex which may be used as patient keywords; date of imaging; and diagnosis name, characteristic item, special opinion of a doctor about diagnosis, all of these factors being specific attributes of particular patients. Input command, registration command and retrieval command may be entered by operating the keyboard 21. The keyboard 21 is connected to a control CPU 22 which supplies a control signal CS to a large scale memory device 23 comprising a record medium such as a magnetic tape, magnetic disc and optical disc in which all the above mentioned patient information and image data are stored. According to the invention, in the large scale memory device 23 is also stored schematic or general images of various parts of body such as oesophagus, stomach, duodenum and liver. The schematic images may be replaced by typical image data corresponding to respective parts of body. The control CPU 22 is also coupled with a main memory device 24 via a data bus 25. The main memory device 24 stores therein retrieval lists which are used upon the retrieval and image data which were taken by the medical apparatus.

FIG. 3 is a schematic view illustrating a data format 20 of the retrieval list and image data. A section 20A contains a patient name, 20B date of birth of the patient, and a section 20C includes general parts of body such as oesophagus, stomach, duodenum and liver. A section 20D is allotted to disease name of the patient, 20E position data indicating a position on a display CRT which is denoted by a light-pen as will be explained later, 20F numbers of a plurality of images of the same part of body of the patient, 20G other information such as opinion of a doctor, a past history of the patient, various kinds of clinical test data and idiosyncrasy of the patient, 20H address at which the relevant data is stored in the large scale memory device 23, and a reference numeral 20I denotes a section to which registered image information is allotted. In the present embodiment, the sections 20A to 20G are termed as the retrieval list and the section 20H and 20I are defined as the image data. New information consisting of retrieval list and image data is once stored in the main memory device 24 and then is stored in the large scale memory device 23 under the control of the control CPU 22.

As shown in FIG. 2, an input device 26 to which the various kinds of medical apparatuses may be connected is coupled with the data bus 25 via an input controller 27. In the case of entering an image data, the operator enters commands into the control CPU 22 by means of the keyboard 21 and then the control CPU 22 supplies a control signal CS to the input controller 27 which then allows the entry of the image data via the input device 26. There is further provided a display controller 28 which transfers a readout address signal RAS from the control CPU 22 to a schematic image memory 29. When th schematic image memory 29 receives the readout address signal RAS from the display controller 28, image data of a schematic image of a part of body which can be sensed or imaged by the medical apparatus or typical image data corresponding to the relevant part of body is read out. The image data thus readout of the display memory 29 is supplied to an image signal generator 30 which converts the image data into an image signal on the basis of a clock signal CLS supplied from the display controller 28. There is further arranged an object image memory 31 which stores image data inherent to a patient which image data is readout of the large scale memory device 23 into the main memory device 24 in accordance with the patient information. The image data stored in the object image memory 31 is readout under the control of a readout address signal RAS supplied from the display controller 28 and the readout image data is converted by an image signal generator 32 into an image signal under the control of the clock signal CLS supplied from the display controller 28. The image signals generated by the image signal generators 30 and 32 are supplied to an image signal mixer 33 to produce an image signal of one frame in which the schematic image of the part of body and the object image of the patient are mixed, and the mixed image is displayed on a display CRT 35. A reference numeral 34 denotes an indicator for indicating the registration and retrieval. In the present embodiment, the indicator 34 is formed by a light-pen, but may be constructed by any other pointing device such as joystick, mouse, tablet and track ball. The indicator 34 is connected to the display controller 28.

Figure 4A:
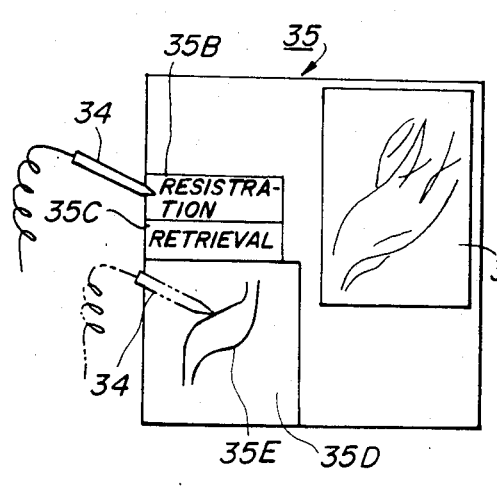
FIGS. 4A and 4B are schematic views showing examples of images reproduced on a display CRT upon registering image data.
Figure 4B:
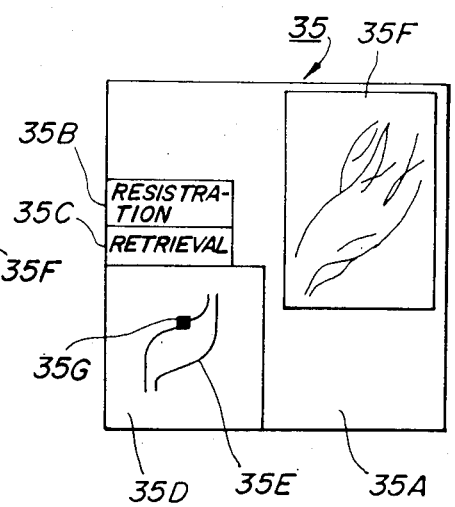
Figure 5A:
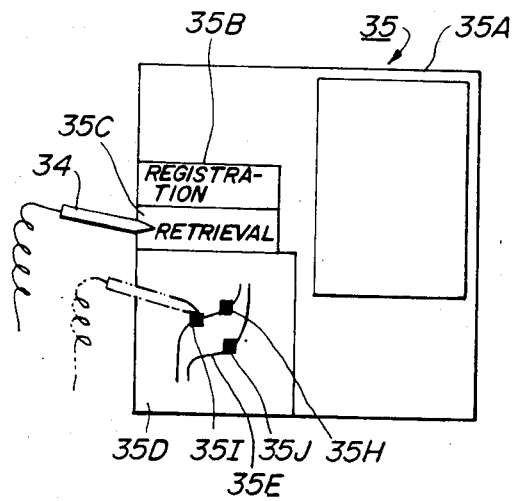
FIGS. 5A and 5B are schematic views illustrating examples of displayed images during the image data retrieval.
Figure 5B:
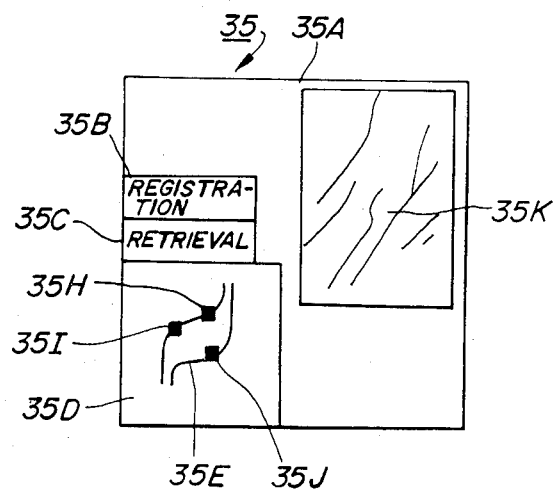

FIGS. 4A, 4B and FIGS. 5A, 5B show examples of the image displayed on the display CRT 35 in case of the registration and retrieval, respectively. FIG. 4A illustrates a situation in which the light-pen 34 is indicating a part of a body whose image is to be just registered and FIG. 4B shows a condition after the completion of the registration. FIG. 5A represents a condition in which the light-pen 34 is indicating a part of body whose image or images are to be retrieved and FIG. 5B is an image displayed after the completion of the retrieval. In FIGS. 4A, 4B, 5A and 5B, a reference numeral 35A indicates generally a displaying screen of the CRT 35, 35B a displayed word "REGISTRATION", 35C a displayed word "RETRIEVAL", 35D is a display area of the schematic image or the typical image data corresponding to the schematic image, 35E a displayed schematic image of a part of body, e.g. stomach and 35F denotes a displayed image which is just entered. In FIG. 4B, a reference numeral 35G denotes a marker which is displayed on the schematic image 35E in a superimposed manner and represents that the input image 35F of a part of body indicated by the marker 35E has been registered. In FIGS. 5A and 5B reference numeral 35H, 35I and 35J denote markers displayed on the schematic image and representing that at least one image of parts of body indicated by the markers has been registered, and a reference numeral 35K indicates a displayed image which has been retrieved.

Now the operation of the image retrieval and registration system according to the invention will be explained in detail. First of all, an operation for entering and storing schematic images of various parts of body will be explained. To this end, the operator operates the keyboard 21 and the control CPU 22 supplies the control signal CS to the input controller 27. Then, picture information of a schematic image generated by a suitable device connected to the input device 26 is supplied via the input device and input controller 27 into the main memory device 24 as well as to the schematic image memory 29. In this manner, the entered schematic image is displayed on the CRT 35. After checking the displayed schematic image, the operator actuates the keyboard 21 to register the entered schematic image. Then the image data of the schematic image stored in the main memory device 24 is transferred into the large scale memory device 23. In this manner, a given desired number of schematic images are stored in the large scale memory device 23.

Next, an operation for registering respective images will be explained. It is assumed that an image of stomach is to be registered. When the operator enters a selection command for the stomach by means of the keyboard 21, a schematic image data of stomach is readout of the large scale memory device 23 into the main memory device 24 and is transferred into the schematic image memory 29 under the control of the control CPU 22. Then the schematic image is displayed on the CRT 35 as illustrated in FIG. 4A by means of the image signal generator 30 which is controlled by the display controller 28. At the same time, the image data of the stomach image to be registered is supplied to the main memory device 24 as well as the object image memory 31 by means of the input device 26 and the input controller 27. Then, the image 35F of the relevant image data is displayed on the given area of the CRT 35 as shown in FIG. 4A. In the manner, on the same screen of the CRT 35 are displayed the schematic image 35E and the input image 35F.

Then the operator indicates the character 35B "REGISTRATION" displayed on the CRT 35 by means of the light-pen 34 to enter a command indicating that the relevant operation is for the registration. Then the operator compares the input image 35F and the schematic image 35E with each other to determine to which part of the stomach the input image belongs, and a determined part is indicated on the displayed schematic image by means of the light-pen 34. In this case, if the input image corresponds to the whole stomach, thus may be indicated also by the light-pen 34 by pointing it on a predetermined area of the CRT screen. Then coordinate data indicated by the light-pen 34 is supplied to the main memory device 24 together with the patient information such as patient name and date of birth which has been previously entered by means of the keyboard 21. Further, all the data thus composed is transferred into the large scale memory 24 is stored therein. It should be noted that the coordinate data and patient information form the retrieval code as explained above with reference to FIG. 3. After the registration has been completed, the marker 35G is displayed on the CRT 35 at the relevant position on the schematic image as illustrated in FIG. 4B. In the manner explained above, desired images of various parts of body supplied via the input device 26 can be registered successively.

Now, an operation of retrieval will be explained with reference to FIGS. 2, 3 and 5. The operator enters a selection command by means of the keyboard 21. Then, a desired schematic image related to the entered selection command is readout of the large scale memory device 23 and is fed to the schematic image memory 29 via the main memory device 24. In this manner, the desired schematic image 35E is displayed on the CRT 35 as shown in FIG. 5A. Then, the operator indicates the character "RETRIEVAL" 35C displayed on the CRT 35 by means of the light-pen 34. Next, a retrieval list containing the patient information such as patient ID and date of birth, and a part of body such as oesophagus, stomach, duodenum and liver is entered by means of the keyboard 21. In response to the retrieval list thus entered, all data having retrieval lists corresponding to the entered retrieval list are readout of the large scale memory device 23 and are stored in the main memory device 24.

In the schematic image 35E displayed on the CRT 35, there are further displayed markers 35H, 35I and 35J indicating that images corresponding to the parts of body indicated by the markers have been registered. Then, the operator denotes one of the markers 35H, 35I and 35J by means of the light-pen 34. Then, the control CPU 22 detects coordinate data of the indicated part of body and checks the retrieval lists and the image data stored in the main memory device 24 and related image data is readout and supplied to the object image memory 31. Then the display controller 28 sends the readout address signals RAS and clock signals CLS to the schematic image memory 29, object image memory 31 and the image signal generators 30 and 32 to generate the image signals of the schematic image and the image data and these image signals are combined in the image signal mixer 33 and the schematic image 35E and the retrieved image 35K are displayed on the CRT 35 as illustrated in FIG. 5B.

By repeating the above explained operation, it is possible to retrieve desired medical images successively.

The present invention is not limited to the embodiment explained above, but many modifications and alternations can be conceived by those skilled in the art within the scope of the invention. For instance, in the above embodiment, on the CRT, only a single medical image is displayed, but a plurality of medical images may be displayed on the same CRT. To this end, a plurality of object image memories may be provided or a single object image memory having a large capacity may be divided into sections in each of which respective medical image data may be stored. A plurality of images may be composed in the image signal mixer 33 and a composed image may be displayed on the CRT 35. In this case, a plurality of images taken by different medical apparatus such as endoscopic photography, X-ray CT, and ultrasonic CT may be displayed simultaneously on the CRT. By this measure, a doctor will be able to judge and analyze a patient on the basis of wide information about the patient. Further, since the registration and retrieval may be effected by using both the patient information and the schematic image displayed on the CRT, the registration and retrieval may be performed speedily and accurately.

The present invention is not limited to the medical application, but may be applied to any other fields in which image data is to be registered and retrieved on the basis of schematic images.

Moreover, in the above embodiment, all the data including the schematic image, medical image and other information are displayed on the one and the same display device. However, these data may be displayed on separate display devices. For instance, the schematic image, medical image and retrieval data and patient data may be displayed on respective display devices.

In the image retrieval and registration system according to the invention, since the registration and retrieval of necessary image data in the image file can be denoted on the schematic image displayed on the display device, the operator can recognize visually the desired image data among a very large number of images and thus, the registration and retrieval can be carried out promptly and easily. Further, since positions of parts of a substance whose images have been registered are indicated on the schematic image, the operator can register or retrieve only desired images speedly. Further, according to the invention, since the retrieval can be performed by keywords which are used in known retrieval system as well as the schematic images or images corresponding thereto, images of a desired part of the substance may easily be retrieved, even if an operator who is effecting the retrieval is different from an operator who has registered the images.

What is claimed is:

1. An image retrieval and registration system comprising:

first storing means for storing one or more schematic images which are used to register input images and to retrieve registered images;

second storing means for storing input images and retrieved images;

mixing means for forming a mixed image signal by mixing an image signal of a schematic image read out of said first storing means and an image signal of an input image or a retrieved image read out of said second storing means;

display means for receiving said mixed image signal from said mixing means and for displaying a mixed image of the schematic image and the input image or retrieved image;

indicating means for indicating a position of a part within the schematic image displayed on said display means; and control means for registering the schematic image stored in said first storing means into said second storing means together with indicating data for indicating the position of a part within the schematic image indicated by said indicating means, and for retrieving at least one registered image stored in said second storing means, said at least one registered image having indicating data for indicating the position of a respective part within the schematic image indicated by said indicating means.

2. A system according to claim 1, wherein said mixing means generates a mixed image signal comprising one frame, and said displaying means comprises a single display screen for displaying said mixed image signal of one frame.

3. A system according to claim 1, wherein said mixing means generates a first image signal of the schematic image and a second image signal of the input image or retrieved image, and said displaying means comprises a first display screen for displaying said first image signal of the schematic image and a second display screen for displaying said second image signal of the input image or retrieved image.

4. A system according to claim 1, wherein said indicating means comprises denoting means for directly denoting a position of a part of the schematic image displayed on said displaying means.

5. A system according to claim 4, wherein said denoting means comprises a light-pen.

6. A system according to claim 5, wherein said indicating means further comprises means for displaying a marker on the schematic image displayed on the displaying means at a position which is denoted by said light-pen.

7. A system according to claim 1, wherein said indicating means comprises marker displaying means for displaying on the schematic image displayed by said displaying means at least one marker at least one position indicated by said indicating data of said registered images.

8. A system according to claim 7, wherein said indicating means comprises denoting means for directly denoting any one of the displayed markers on the schematic image.

9. A system according to claim 8, wherein said denoting means comprises a light-pen.

10. A system according to claim 1, wherein said schematic images are formed by graphic images.

11. A system according to claim 1, wherein said schematic images are formed by data images.

12. A system according to claim 1, wherein said schematic images are formed by images representing parts of a body.

* * * * *